US011653268B2

(12) United States Patent
Galecki et al.

(10) Patent No.: US 11,653,268 B2
(45) Date of Patent: May 16, 2023

(54) DYNAMICALLY ADJUSTING THE BANDWIDTH OF DOWNLINK TRANSMISSIONS BASED ON A RADIO ACCESS TECHNOLOGY USED BY A RADIO ACCESS NETWORK

(71) Applicant: Microsoft Technology Licensing, LLC, Redmond, WA (US)

(72) Inventors: Piotr Michal Galecki, Lexington, MA (US); Michael Anthony Brown, McKinney, TX (US); Haibo Qian, Frisco, TX (US); Fred Walter Rink, Fairview, TX (US); Liang Tian, Bethesda, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/348,568

(22) Filed: Jun. 15, 2021

(65) Prior Publication Data

US 2022/0400413 A1     Dec. 15, 2022

(51) Int. Cl.
*H04W 28/20*     (2009.01)
*H04W 28/22*     (2009.01)
(Continued)

(52) U.S. Cl.
CPC ........... *H04W 28/20* (2013.01); *H04W 28/22* (2013.01); *H04W 36/0069* (2018.08); *H04W 76/15* (2018.02)

(58) Field of Classification Search
CPC . H04W 28/20; H04W 28/22; H04W 36/0069; H04W 76/15
See application file for complete search history.

(56) References Cited

U.S. PATENT DOCUMENTS

| 8,295,852 | B2 | 10/2012 | Buracchini et al. |
| 9,473,986 | B2 * | 10/2016 | Tomici ................. H04W 28/16 |

(Continued)

FOREIGN PATENT DOCUMENTS

| AU | 2013100806 A4 * | 7/2013 |
| EP | 3806536 A1 | 4/2021 |

(Continued)

OTHER PUBLICATIONS

Filin, et al., "ITU-R Standardization Activities on Cognitive Radio Systems", In Proceedings of 6th International ICST Conference on Cognitive Radio Oriented Wireless Networks and Communications, Jun. 1, 2011, pp. 116-120.

(Continued)

*Primary Examiner* — Ahmed Elallam
(74) *Attorney, Agent, or Firm* — Ray Quinney & Nebeker P.C; James Bullough

(57) ABSTRACT

A core network can send first data transmissions to a radio access network (RAN) at a first data rate that is based at least in part on a first RAT policy associated with a first RAT used by the RAN for downlink transmissions to user equipment. The core network can obtain information indicating that the RAN is using a second RAT for the downlink transmissions to the user equipment. The core network can cause a RAT policy that is applied to the data transmissions from the core network to the RAN to be changed from the first RAT policy to a second RAT policy that is associated with the second RAT. The core network can send second data transmissions from the core network to the RAN at a second data rate that is based at least in part on the second RAT policy.

20 Claims, 9 Drawing Sheets

(51) Int. Cl.
*H04W 36/00* (2009.01)
*H04W 76/15* (2018.01)

(56) References Cited

U.S. PATENT DOCUMENTS

| | | | | |
|---|---|---|---|---|
| 10,039,037 | B2* | 7/2018 | Taneja | H04W 36/02 |
| 10,630,553 | B2 | 4/2020 | Thompson | |
| 10,630,597 | B2 | 4/2020 | Yun et al. | |
| 10,868,762 | B2* | 12/2020 | Chung | H04L 41/40 |
| 2011/0077015 | A1 | 3/2011 | Saily et al. | |
| 2012/0324100 | A1* | 12/2012 | Tomici | H04W 28/0268 |
| | | | | 709/224 |
| 2016/0073441 | A1* | 3/2016 | Faccin | H04W 12/06 |
| | | | | 370/329 |
| 2017/0094572 | A1* | 3/2017 | Yang | H04W 76/27 |
| 2017/0201902 | A1* | 7/2017 | Chen | H04W 28/0215 |
| 2018/0206282 | A1* | 7/2018 | Singh | H04W 76/15 |
| 2019/0182762 | A1* | 6/2019 | Mutikainen | H04W 48/18 |
| 2019/0364417 | A1* | 11/2019 | Patil | H04W 8/04 |
| 2020/0022131 | A1 | 1/2020 | Li et al. | |
| 2021/0329466 | A1* | 10/2021 | Khasnabish | H04W 48/18 |

FOREIGN PATENT DOCUMENTS

| | | | |
|---|---|---|---|
| JP | 2014230103 | A * | 12/2014 |
| JP | 2015002388 | A * | 1/2015 |
| WO | 2021001085 | A1 | 1/2021 |
| WO | 2021002731 | A1 | 1/2021 |
| WO | 2021022394 | A1 | 2/2021 |
| WO | 2021050171 | | 3/2021 |

OTHER PUBLICATIONS

"International Search Report Written Opinion Issued in PCT Patent Application No. PCT/US22/030981", dated Sep. 20, 2022, 13 Pages.

* cited by examiner

DYNAMICALLY ADJUSTING THE BANDWIDTH OF DOWNLINK TRANSMISSIONS BASED ON A RADIO ACCESS TECHNOLOGY USED BY A RADIO ACCESS NETWORK

CROSS-REFERENCE TO RELATED APPLICATIONS

N/A

BACKGROUND

Mobile telecommunications networks are widely deployed to provide various communication services such as voice, text messaging, multimedia data, Internet connectivity, and the like. Mobile telecommunications networks can be multiple-access networks capable of supporting multiple users by sharing the available network resources. Mobile telecommunications networks may be referred to herein simply as mobile networks.

A mobile network is distributed over geographical areas that are typically referred to as "cells." Each cell can be served by at least one base station. One or more base stations provide a cell with network coverage, which can be used for transmission of voice, data, and other types of content. When joined together, these cells provide radio coverage over a wide geographic area. In addition, a mobile network is typically connected to the Internet. Thus, a mobile network enables a mobile device to communicate with other mobile devices within the mobile network, as well as other computing devices that are connected to the Internet.

There are many different types of mobile devices that can be used in connection with a mobile network. Mobile devices have traditionally included smartphones, tablet computers, and laptop computers, but will increasingly include cars, drones, industrial and agricultural machines, robots, home appliances, medical devices, and so on. In the context of mobile networks, mobile devices are often referred to as user equipment (UE).

Mobile networks have undergone significant changes over the past several decades. The first two generations of mobile networks supported voice and then text. Third generation (3G) networks initiated the transition to broadband access, supporting data rates typically measured in hundreds of kilobits-per-second. Fourth generation (4G) networks supported data rates that were significantly faster, typically measured in megabits-per-second. Today, the industry is transitioning from 4G to fifth generation (5G) networks, with the promise of significant increases in data rates.

In addition to providing higher data rates, 5G networks are also expected to provide support for a wide range of use cases, such as the Internet-of-Things (IoT), autonomous vehicles, immersive user interfaces (e.g., augmented reality and virtual reality systems), and the like. There is more to supporting these services than just increasing bandwidth or reducing latency for individual users. 5G represents a fundamental rearchitecture of the access network that facilitates the transition from a single access service (broadband connectivity) to a richer collection of edge services and devices.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

One aspect of the present disclosure is directed to a method for optimizing data transmissions from a core network to a radio access network (RAN) based on a radio access technology (RAT) being used by the RAN for downlink transmissions to UEs. The RAN is configured to use a first RAT and a second RAT for the downlink transmissions to the UEs. The method is implemented by the core network. The method comprises sending first data transmissions from the core network to the RAN at a first data rate that is based at least in part on a first RAT policy associated with the first RAT. The method also comprises obtaining information indicating that the RAN is using the second RAT for the downlink transmissions to the UEs. The method also comprises causing a RAT policy that is applied to the data transmissions from the core network to the RAN to be changed in response to obtaining the information indicating that the RAN is using the second RAT for the downlink transmissions to the UEs. The RAT policy is changed from the first RAT policy to a second RAT policy that is associated with the second RAT. The method also comprises sending second data transmissions from the core network to the RAN at a second data rate that is based at least in part on the second RAT policy associated with the second RAT.

In some embodiments, the first RAT can support higher data rates than the second RAT. The first RAT policy can allow a higher data rate for the data transmissions from the core network to the RAN than the second RAT policy. The first data rate can be higher than the second data rate.

In some embodiments, the second RAT can support higher data rates than the first RAT. The second RAT policy can allow a higher data rate for the data transmissions from the core network to the RAN than the first RAT policy. The second data rate can be higher than the first data rate.

In some embodiments, the first RAT policy can comprise a first rule that should be applied to the data transmissions from the core network to the RAN when the RAN is using the first RAT. The second RAT policy can comprise a second rule that should be applied to the data transmissions from the core network to the RAN when the RAN is using the second RAT.

In some embodiments, the first RAT policy can comprise a first maximum data rate for the data transmissions from the core network to the RAN when the RAN is using the first RAT. The second RAT policy can comprise a second maximum data rate for the data transmissions from the core network to the RAN when the RAN is using the second RAT.

In some embodiments, the RAN and the core network can be part of a fifth generation (5G) mobile network. The first RAT can be based on millimeter wave (mmWave) frequencies. The second RAT can be based on at least one of sub-6 GHz frequencies or low band frequencies.

In some embodiments, the first data transmissions and the second data transmissions can comprise a plurality of IP flows. Obtaining the information indicating that the RAN is using the second RAT can comprise determining at least one latency metric corresponding to the plurality of IP flows and comparing the at least one latency metric to at least one threshold.

In some embodiments, obtaining the information indicating that the RAN is using the second RAT can comprise inspecting uplink packets sent by the RAN and identifying an indication about a RAT type being used by the RAN in at least one uplink packet.

In some embodiments, causing the RAT policy that is applied to the data transmissions from the core network to the RAN to be changed can comprise notifying a content provider that the RAN is using the second RAT.

Another aspect of the present disclosure is directed to a method for optimizing data transmissions from a core network to a radio access network (RAN) based on a radio access technology (RAT) being used by the RAN for downlink transmissions to UEs. The RAN is configured to use a first RAT and a second RAT for the downlink transmissions to the UEs. The method is implemented by the RAN. The method comprises receiving first data transmissions from the core network at a first data rate that is based at least in part on a first RAT policy applied by the core network. The first RAT policy is associated with the first RAT. The method also comprises using the second RAT for the downlink transmissions to the UEs. The method also comprises sending at least one uplink data packet to the core network indicating that the RAN is using the second RAT for the downlink transmissions to the UEs. The method also comprises receiving second data transmissions from the core network at a second data rate that is based at least in part on a second RAT policy applied by the core network. The second RAT policy is associated with the second RAT.

In some embodiments, the first RAT can support higher data rates than the second RAT. The first RAT policy can allow a higher data rate for the data transmissions from the core network to the RAN than the second RAT policy. The first data rate can be higher than the second data rate.

In some embodiments, the second RAT can support higher data rates than the first RAT. The second RAT policy can allow a higher data rate for the data transmissions from the core network to the RAN than the first RAT policy. The second data rate can be higher than the first data rate.

In some embodiments, the RAN and the core network are part of a fifth generation (5G) mobile network. The first RAT can be based on millimeter wave (mmWave) frequencies. The second RAT can be based on at least one of sub-6 GHz frequencies or low band frequencies.

Another aspect of the present disclosure is a system for optimizing data transmissions from a core network to a radio access network (RAN) based on a radio access technology (RAT) being used by the RAN for downlink transmissions to UEs. The RAN is configured to use a first RAT and a second RAT for the downlink transmissions to the UEs. The system comprises one or more processors and memory in electronic communication with the one or more processors. A first RAT policy and a second RAT policy are stored in the memory. The first RAT policy is associated with the first RAT used by the RAN. The second RAT policy is associated with the second RAT used by the RAN. Instructions are stored in the memory. The instructions are executable by the one or more processors to send first data transmissions from the core network to the RAN at a first data rate that is based at least in part on the first RAT policy. The instructions are also executable by the one or more processors to obtain information indicating that the RAN is using the second RAT for the downlink transmissions to the UEs. The instructions are also executable by the one or more processors to cause a RAT policy that is applied to the data transmissions from the core network to the RAN to be changed in response to obtaining the information indicating that the RAN is using the second RAT for the downlink transmissions to the UEs. The RAT policy is changed from the first RAT policy to the second RAT policy. The instructions are also executable to send second data transmissions from the core network to the RAN at a second data rate that is based at least in part on the second RAT policy.

In some embodiments, the first RAT can support higher data rates than the second RAT. The first RAT policy can allow a higher data rate for the data transmissions from the core network to the RAN than the second RAT policy. The first data rate can be higher than the second data rate.

In some embodiments, the second RAT can support higher data rates than the first RAT. The second RAT policy can allow a higher data rate for the data transmissions from the core network to the RAN than the first RAT policy. The second data rate can be higher than the first data rate.

In some embodiments, the first RAT policy can comprise a first rule that should be applied to the data transmissions from the core network to the RAN when the RAN is using the first RAT. The second RAT policy can comprise a second rule that should be applied to the data transmissions from the core network to the RAN when the RAN is using the second RAT.

In some embodiments, the RAN and the core network can be part of a fifth generation (5G) mobile network. The first RAT can be based on millimeter wave (mmWave) frequencies. The second RAT can be based on at least one of sub-6 GHz frequencies or low band frequencies.

In some embodiments, the first data transmissions and the second data transmissions can comprise a plurality of IP flows. Obtaining the information indicating that the RAN is using the second RAT can comprise determining at least one latency metric corresponding to the plurality of IP flows and comparing the at least one latency metric to at least one pre-defined threshold.

In some embodiments, obtaining the information indicating that the RAN is using the second RAT can comprise inspecting uplink packets sent by the RAN and identifying an indication about a RAT type being used by the RAN in at least one uplink packet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
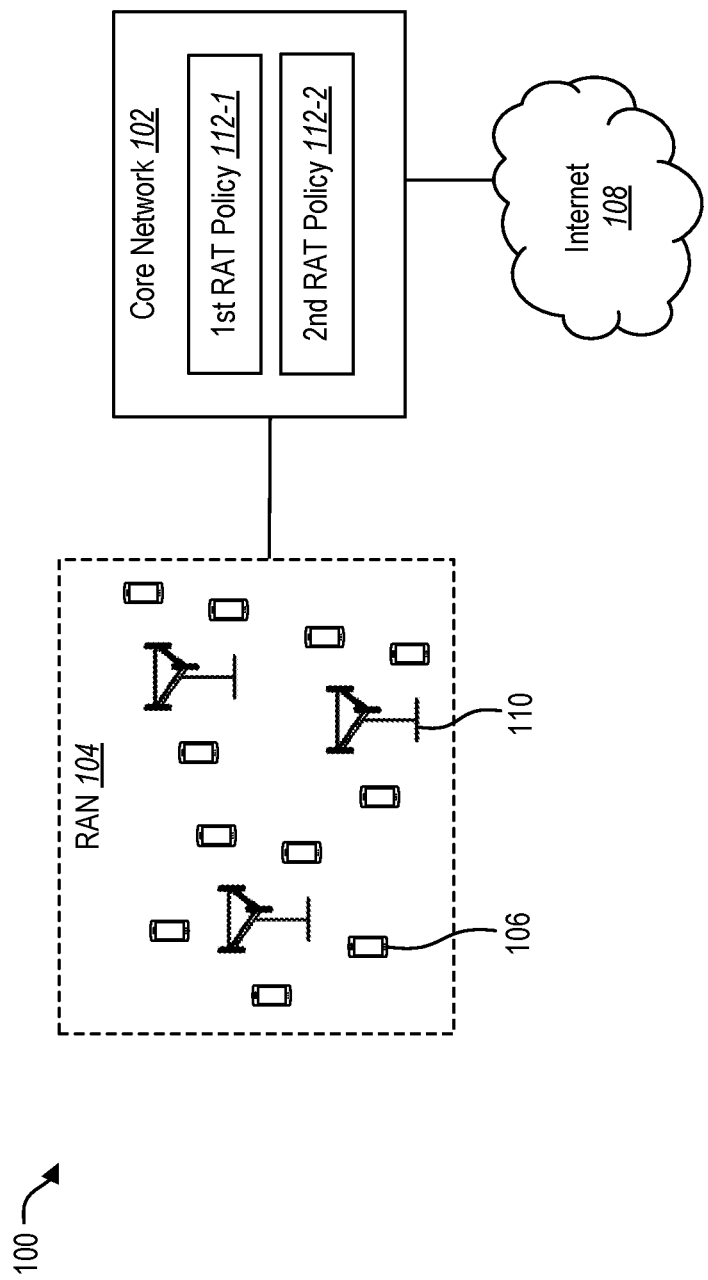
FIG. 1 illustrates an example of a mobile network in which the techniques disclosed herein can be utilized.

The present disclosure is generally related to a mobile telecommunications network that includes a radio access network (RAN) that is configured to use at least two different radio access technologies (RATs) for downlink transmissions to UEs.

As one example, the techniques disclosed herein can be used in 5G mobile networks. As noted above, 5G networks are expected to provide significantly higher data rates than previous generations of mobile networks. These higher data rates are due at least in part to a new technology known as millimeter wave (mmWave). The term mmWave typically refers to a specific part of the radio frequency spectrum above about 24 GHz. Advantageously, radio waves in this part of the frequency spectrum can transfer data at extremely high speeds. Although mmWave 5G networks are extremely fast, they are also ultra-short range. This makes them less feasible for suburban and rural areas. The mmWave spectrum is also blocked and obscured by objects (e.g., walls, trees), further limiting its available range.

However, the mmWave technology is just one part of what 5G networks will use. Other frequencies that will also be part of the 5G standard include sub-6 GHz frequencies and low band frequencies. The term "sub-6 GHz" refers to frequency bands under 6 GHz. The term "low band" typically refers to frequency bands under 1 GHz. Lower frequencies cover much greater distances than higher frequencies, but they also provide much slower data speeds.

Thus, the RAN within a 5G network can be configured to use at least two different RATs. A first RAT used by a 5G RAN can be a mmWave-based RAT. A second RAT used by a 5G RAN can be based on lower frequencies (e.g., sub-6 GHz frequencies, low band frequencies).

Under some circumstances, the core network may be unaware of whether the RAN is using a mmWave-based RAT or a RAT based on lower frequencies. For example, some 5G deployments are working as 5G non-standalone (NSA), which means they rely on the existence of a 4G Long Term Evolution (LTE) network to function properly. On the RAN side, 5G NSA deployments have the ability to extend the user plane resources on the RAN to utilize some of the 5G frequencies in order to provide higher bandwidth for different applications. When the RAN actually switches the user plane from 4G to 5G, that switching is typically transparent to the core network.

When the core network is unable to determine whether a RAN is using mmWave frequencies or lower frequencies, this can cause problems. For example, when the core network has data to send to a UE, the core network can forward the data to the RAN based on the assumption that the RAN is using mmWave frequencies for downlink transmissions to UEs. If the RAN is not using mmWave frequencies but is using lower frequencies instead, the core network can end up sending data to the RAN at a much higher data rate than the RAN is able to deliver the data to the UE.

One aspect of the present disclosure is related to optimizing throughput for data transmissions being sent from a core network to a RAN. More specifically, the techniques disclosed herein can enable a core network to send data to a RAN at an optimal data rate for the RAT that is being used by the RAN. For example, in the context of a 5G mobile network, the techniques disclosed herein can be used to detect whether a RAN is using mmWave frequencies or lower frequencies (e.g., sub-6 GHz frequencies, low band frequencies). Once this has been detected, the core network can adjust the throughput to the RAN based on the available bandwidth.

In one possible scenario, if the core network has been sending data to the RAN based on the assumption that the RAN is using lower frequencies but then detects that the RAN is actually using high-bandwidth mmWave frequencies, then the core network can increase its throughput to the RAN. On the other hand, if the core network has been sending data to the RAN based on the assumption that the RAN is using high-bandwidth mmWave frequencies but then detects that the RAN is actually using lower frequencies, the core network can decrease its throughput to the RAN accordingly.

Figure 2:
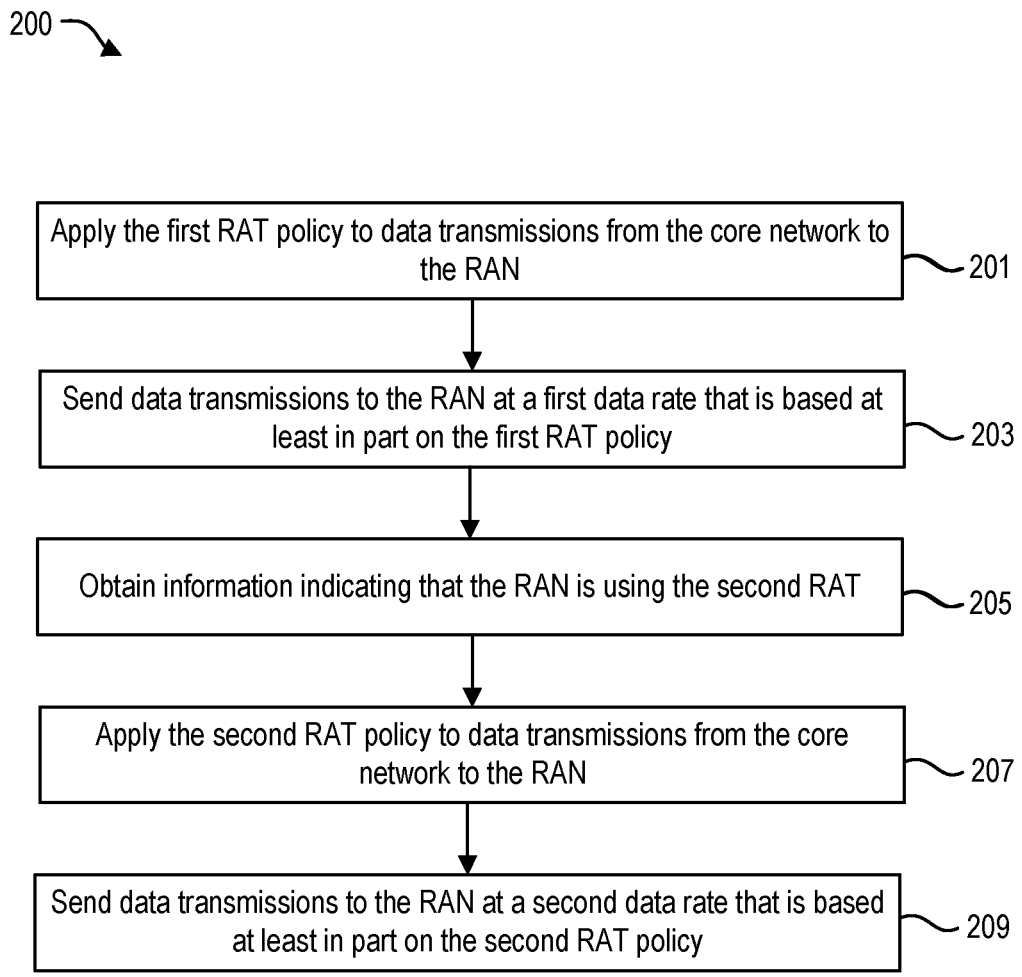
FIG. 2 illustrates an example of a method that can be implemented by a core network in the mobile network shown in FIG. 1.

FIGS. 1 and 2 illustrate an example showing how data transmissions from a core network 102 to a radio access network (RAN) 104 can be optimized in accordance with the present disclosure. More specifically, FIG. 1 illustrates an example of a mobile network 100 in which the techniques disclosed herein can be utilized. FIG. 2 illustrates an example of a method 200 that can be implemented by a core network 102 in the mobile network 100.

Reference is initially made to FIG. 1. The mobile network 100 includes a core network 102 and a RAN 104. The core network 102 and the RAN 104 function together to provide UEs 106 with access to services available from one or more external packet data networks. At least some services can be provided via the Internet 108.

The RAN 104 manages the radio spectrum, making sure it is used efficiently and meets users' quality-of-service (QoS) requirements. The RAN 104 includes a plurality of base stations 110 that communicate wirelessly with UEs 106 and enable the UEs 106 to wirelessly connect to the mobile network 100. A base station 110 can provide wireless connectivity for UEs 106 within a particular geographic area, which can be referred to as a "cell." In 4G networks, a base station 110 is referred to as an evolved Node B (which is often shortened to "eNodeB" or "eNB"). In 5G networks, a base station 110 is referred to as gNB (where the "g" stands for "next generation").

The core network 102 performs a variety of functions, including providing Internet protocol (IP) connectivity for both data and voice services, ensuring this connectivity fulfills the promised QoS requirements, ensuring that the UEs 106 are properly authenticated, tracking user mobility to ensure uninterrupted service, and tracking subscriber usage for billing and charging.

The core network 102 can include a control plane and a user plane. The delivery of services to UEs 106 can occur via the user plane. Signaling that supports the establishment and maintenance of the user plane can occur via the control plane. In a 4G network the core network 102 is called the Evolved Packet Core (EPC), and in a 5G network it is called the Next Generation Core (NG-Core).

A wireless channel can be established for a UE 106 when the UE 106 is powered on within the coverage area of a base station 110 in the mobile network 100, or when the UE 106 moves within the coverage area of a base station 110 in the mobile network 100. When a wireless channel is established for a UE 106, control plane connectivity can be established between the UE 106 and the control plane of the core network 102. This enables signaling traffic to be sent from the control plane to the UE 106 (and vice versa). This signaling traffic enables UE 106 authentication, registration, and mobility tracking. In addition, one or more tunnels can be established between the UE 106 and the user plane of the core network 102. These tunnels can be used to carry voice traffic and data.

The RAN 104 can be configured to use one or more different radio access technologies (RATs) for wireless transmissions to UEs 106. In some embodiments, the RAN 104 can be configured to use at least two different RATs. Moreover, the different RATs used by the RAN 104 can support different data rates for wireless transmissions to UEs 106. More specifically, the RAN 104 can be configured to use at least a first radio access technology (RAT) and a second RAT for wireless transmissions to UEs 106. The first RAT can support a higher data rate for wireless transmissions to UEs 106 than the second RAT (or vice versa). In some embodiments, the mobile network 100 can be a 5G mobile network, the first RAT can be a mmWave-based RAT, and the second RAT can be based on lower frequencies (e.g., sub-6 GHz frequencies, low band frequencies).

The core network 102 can be configured to detect which RAT is being used by the RAN 104, and to adjust the data rate of data transmissions from the core network 102 to the RAN 104 accordingly. In a scenario where the RAN 104 is configured to use a first RAT and a second RAT, the core network 102 can be configured to detect which of the first RAT and the second RAT is being used by the RAN 104, and to adjust the data rate of data transmissions to the RAN 104 based on which RAT is being used. If the core network 102 detects that the RAN 104 is using a RAT that supports a higher data rate, the core network 102 can take one or more actions that have the effect of increasing the data rate of transmissions from the core network 102 to the RAN 104. On the other hand, if the core network 102 detects that the RAN 104 is using a RAT that only supports a lower data rate, the core network 102 can take one or more actions that have the effect of decreasing the data rate of transmissions from the core network 102 to the RAN 104.

In some embodiments, the core network 102 can include a User Plane Function (UPF). The UPF is one of the network functions (NFs) of the core network in a 5G mobile network. The UPF is responsible for packet routing and forwarding, packet inspection, QoS handling, and external PDU session for interconnecting Data Network (DN). The UPF can be configured to perform RAT detection and throughput rate adjustments as disclosed herein.

The core network 102 can define policies that affect one or more aspects of data transmissions from the core network 102 to the RAN 104. For example, the core network 102 can define policies that affect a data rate of data transmissions from the core network 102 to the RAN 104. In a scenario where the RAN 104 is configured to use a first RAT and a second RAT, at least one policy can be defined for use in connection with data transmissions from the core network 102 to the RAN 104 when the RAN 104 is using the first RAT. Such a policy may be referred to herein as a first RAT policy 112-1. In addition, at least one policy can be defined for use in connection with data transmissions from the core network 102 to the RAN 104 when the RAN 104 is using the second RAT. Such a policy may be referred to herein as a second RAT policy 112-2.

For simplicity, two RAT policies (the first RAT policy 112-1 and the second RAT policy 112-2) are shown in the example depicted in FIG. 1. However, the number of RAT policies shown in this example (or other examples described herein) should not be interpreted as limiting the scope of the present disclosure. In some embodiments, the core network 102 can define more than two RAT policies.

In some embodiments, the first RAT can support higher data rates than the second RAT. In such embodiments, the first RAT policy 112-1 associated with the first RAT can be less restrictive (e.g., can permit a higher data rate for data transmissions from the core network 102 to the RAN 104) than the second RAT policy 112-2 associated with the second RAT.

Alternatively, the second RAT can support higher data rates than the first RAT. In such embodiments, the second RAT policy 112-2 associated with the second RAT can be less restrictive (e.g., can permit a higher downlink data rate) than the first RAT policy 112-1 associated with the first RAT.

There are many different ways that the first RAT policy 112-1 and the second RAT policy 112-2 can be structured. In some embodiments, the first RAT policy 112-1 and the second RAT policy 112-2 can both specify a maximum data rate for data transmissions from the core network 102 to the RAN 104. For example, the first RAT policy 112-1 can specify a first maximum data rate for data transmissions from the core network 102 to the RAN 104 when the RAN 104 is using the first RAT. The second RAT policy 112-2 can specify a second maximum data rate for data transmissions from the core network 102 to the RAN 104 when the RAN 104 is using the second RAT. If the first RAT supports a higher data rate than the second RAT, then the first maximum data rate specified by the first RAT policy 112-1 can be higher than the second maximum data rate specified by the second RAT policy 112-2. Conversely, if the second RAT supports a higher data rate than the first RAT, then the second maximum data rate specified by the second RAT policy 112-2 can be higher than the first maximum data rate specified by the first RAT policy 112-1.

In some embodiments, the first RAT policy 112-1 and the second RAT policy 112-2 can both include at least one rule that should be applied to data transmissions from the core network 102 to the RAN 104. For example, the first RAT policy 112-1 can include at least one rule that should be applied when the RAN 104 is using the first RAT. Similarly, the second RAT policy 112-2 can include at least one rule that should be applied when the RAN 104 is using the second RAT.

The rules in the first RAT policy 112-1 and the second RAT policy 112-2 can be related to one or more characteristics of data transmissions from the core network 102 to the RAN 104. In one possible scenario where the first RAT supports a higher data rate than the second RAT, the first RAT policy 112-1 can indicate that video data should be transmitted from the core network 102 to the RAN 104 at high resolution, and the second RAT policy 112-2 can indicate that video data should be transmitted from the core network 102 to the RAN 104 at lower resolution.

Reference is now made to the method 200 shown in FIG. 2. For purposes of example, it will be assumed that the core network 102 initially applies 201 the first RAT policy 112-1 to data transmissions from the core network 102 to the RAN 104. As a result, the core network 102 can send 203 data transmissions to the RAN 104 at a first data rate that is based at least in part on the first RAT policy 112-1.

A data rate can be based at least in part on a RAT policy if the RAT policy affects or influences the data rate. In other words, a data rate can be based at least in part on a RAT policy if the data rate would (or could) be different in the absence of the RAT policy.

As noted above, in some embodiments a RAT policy can specify a maximum data rate for data transmissions from the core network 102 to the RAN 104 when the RAN 104 is using a particular RAT. In such embodiments, the data rate for data transmissions from the core network 102 to the RAN 104 is affected by the RAT policy because the RAT policy specifies a data rate that the data transmissions are not permitted to exceed. However, it is not necessary for a RAT policy to specify a maximum data rate. In some embodiments, a RAT policy can include one or more rules that, when applied, affect the data rate of data transmissions from the core network 102 to the RAN 104 without specifying a maximum data rate.

At some point, the core network 102 can obtain 205 information indicating that the RAN 104 is using the second RAT. There are many different ways that this can occur.

For example, the core network 102 can determine at least one latency metric corresponding to a plurality of IP flows that are being sent to the RAN 104. The latency metric(s) can be compared to one or more pre-defined thresholds. Based on the comparison(s), the core network 102 can make an inference about which RAT is being used by the RAN 104. In this context, the term "latency metric" can refer to a metric that is related to latency. For example, a latency metric can be a measurement of the round trip time with respect to individual packet exchanges that are part of an IP flow. Some examples of this approach will be described in greater detail below.

As another example, uplink packets sent by the RAN 104 can be modified to include an indication about a RAT type being used by the RAN 104. The core network 102 can inspect uplink packets sent by the RAN 104 and identify the indication about the RAT type. This, too, will be described in greater detail below.

In response to obtaining 205 information indicating that the RAN 104 is using the second RAT, the core network 102 can change the RAT policy that is applied to the data transmissions from the core network 102 to the RAN 104. In particular, the RAT policy can be changed from the first RAT policy 112-1 associated with the first RAT to the second RAT policy 112-2 associated with the second RAT. Thus, the method 200 can include applying 207 the second RAT policy 112-2 to data transmissions from the core network 102 to the RAN 104. Once the RAT policy has been changed in this manner, the method 200 can then include sending 209 data transmissions from the core network 102 to the RAN 104 at a second data rate. The second data rate can be based at least in part on the second RAT policy 112-2.

Changing the RAT policy that is applied to the data transmissions from the core network 102 to the RAN 104 can include modifying the processing that is performed by the user plane function (UPF) within the core network 102.

In some scenarios, the method 200 shown in FIG. 2 can cause the data rate of data transmissions from the core network 102 to the RAN 104 to be decreased. For example, in embodiments where the first RAT supports higher data rates than the second RAT, the first RAT policy 112-1 associated with the first RAT can be less restrictive (e.g., can permit a higher downlink data rate) than the second RAT policy 112-2 associated with the second RAT. In such embodiments, changing from the first RAT policy 112-1 associated with the first RAT to the second RAT policy 112-2 associated with the second RAT can cause the data rate for data transmissions from the core network 102 to the RAN 104 to be decreased.

Alternatively, in embodiments where the second RAT supports higher data rates than the first RAT, the second RAT policy 112-2 associated with the second RAT can be less restrictive (e.g., can permit a higher downlink data rate) than the first RAT policy 112-1 associated with the first RAT. In such embodiments, changing from the first RAT policy 112-1 associated with the first RAT to the second RAT policy 112-2 associated with the second RAT can cause the data rate for data transmissions from the core network 102 to the RAN 104 to be increased.

In some embodiments, the core network 102 can directly change the RAT policy that is applied to the data transmissions from the core network 102 to the RAN 104. In other embodiments, the core network 102 can take some action that causes the RAT policy to be changed. For example, after obtaining 205 information indicating that the RAN 104 is using the second RAT, the core network 102 could notify a content provider that the RAN 104 is using the second RAT. The content provider could then change some aspect of the content that is being provided to one or more UEs within the RAN 104. For instance, in a scenario where the core network 102 detects that the RAN 104 is using a high-bandwidth RAT (e.g., an mmWave-based RAT in a 5G mobile network), the core network 102 could notify a content provider about this. In response, the content provider could begin sending richer content (e.g., high definition video).

In some embodiments, a base station could use different RATs for different UEs. In such embodiments, the core network could apply different RAT policies to different UEs being served by the same base station. For example, a base station in a 5G mobile network could use mmWave frequencies for downlink transmissions to a first UE, but then use lower frequencies for downlink transmissions to a second UE. In this scenario, the core network could apply a first RAT policy (e.g., a less restrictive RAT policy that permits a higher downlink data rate) for transmissions to the base station that are destined for the first UE and a second RAT policy (e.g., a more restrictive RAT policy that places greater restrictions on the downlink data rate) for transmissions to the base station that are destined for the second UE.

Figure 3:
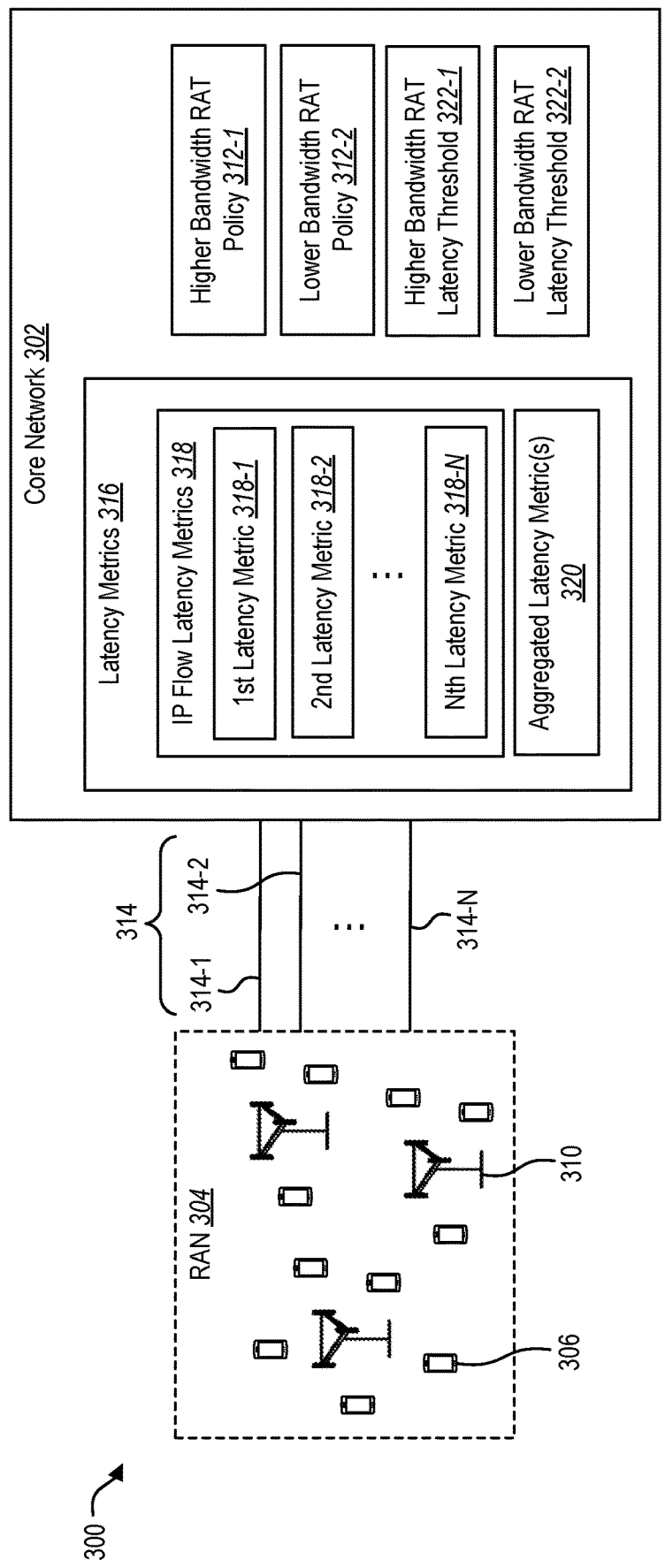
FIG. 3 illustrates another example of a mobile network in which the techniques disclosed herein can be utilized.
Figure 4:
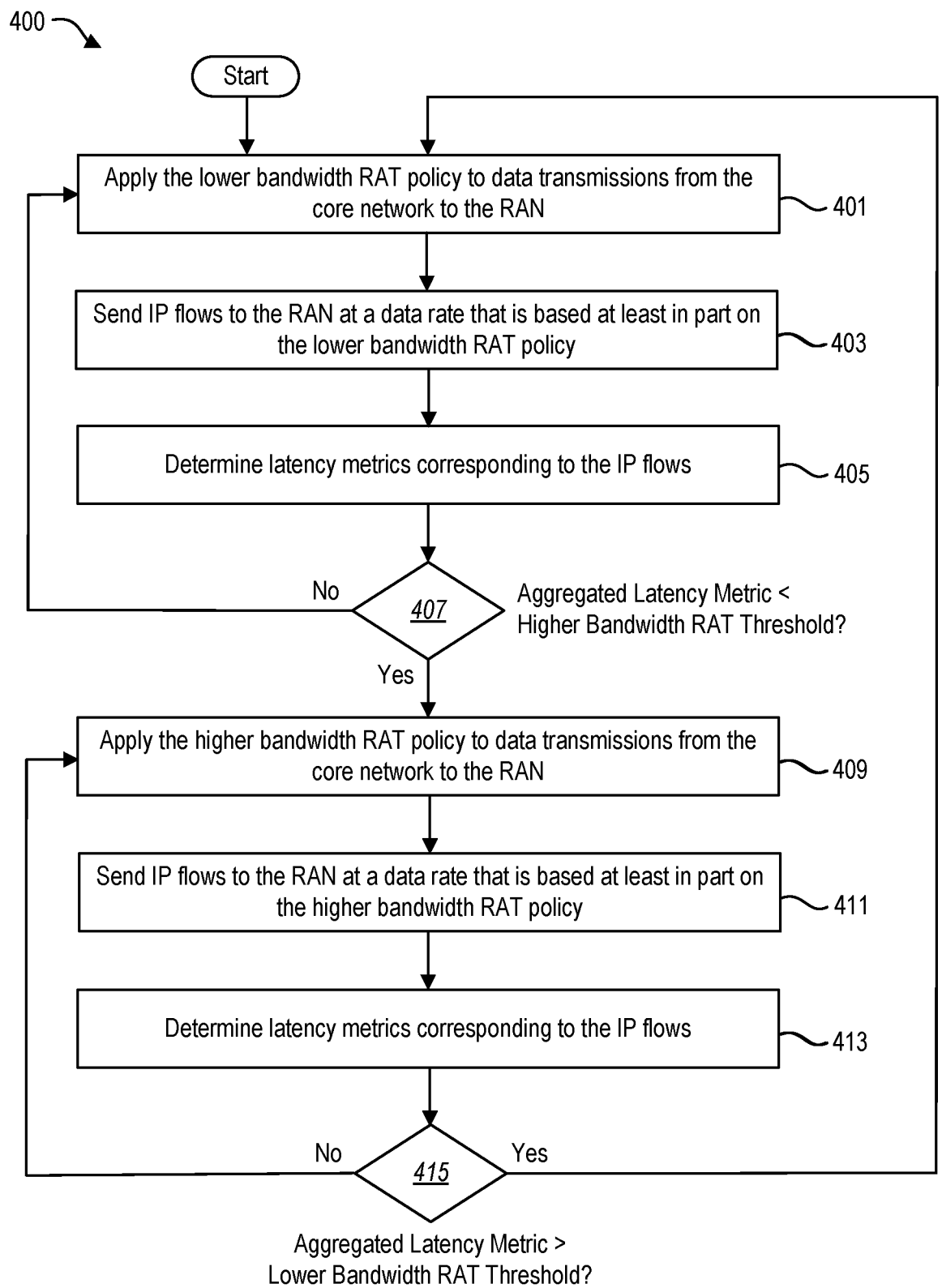
FIG. 4 illustrates an example of a method that can be implemented by a core network in the mobile network shown in FIG. 3.

FIGS. 3 and 4 illustrate another example showing how data transmissions from a core network 302 to a RAN 304 can be optimized in accordance with the present disclosure. More specifically, FIG. 3 illustrates another example of a mobile network 300 in which the techniques disclosed herein can be utilized. FIG. 4 illustrates an example of a method 400 that can be implemented by a core network 302 in the mobile network 300.

Reference is initially made to FIG. 3. The mobile network 300 shown in FIG. 3 is similar in many respects to the mobile network 100 shown in FIG. 1. In particular, the mobile network 300 includes a core network 302 and a RAN 304. The RAN 304 includes a plurality of base stations 310 that communicate wirelessly with UEs 306 and enable the UEs 306 to wirelessly connect to the mobile network 300.

The RAN 304 can be configured to use at least two different RATs for wireless transmissions to UEs 306, including a first RAT and a second RAT. In the depicted example, it will be assumed that the first RAT supports a higher data rate than the second RAT. Therefore, the first RAT will be referred to as a higher bandwidth RAT and the second RAT will be referred to as a lower bandwidth RAT.

At least one policy can be defined for use in connection with data transmissions from the core network 302 to the RAN 304 when the RAN 304 is using the higher bandwidth RAT. Such a policy may be referred to herein as a higher bandwidth RAT policy 312-1. In addition, at least one policy can be defined for use in connection with downlink transmissions when the RAN 304 is using the lower bandwidth RAT. Such a policy may be referred to herein as a lower bandwidth RAT policy 312-2.

In the depicted example, it will be assumed that the core network 302 sends a plurality of IP flows 314 to the RAN 304 for delivery to a particular UE 306. In particular, FIG. 3 shows the core network 302 sending a first IP flow 314-1, a second IP flow 314-2, and an Nth IP flow 314-N. The value of N can be any positive integer.

The core network 302 can determine a plurality of latency metrics 316 corresponding to the plurality of IP flows 314. The plurality of latency metrics 316 can include latency metrics 318 corresponding to individual IP flows. In particular, FIG. 3 shows a first latency metric 318-1 corresponding to the first IP flow 314-1, a second latency metric 318-2 corresponding to the second IP flow 314-2, and an Nth latency metric 318-N corresponding to the Nth IP flow 314-N. The plurality of latency metrics 316 can also include one or more aggregated latency metrics 320. An aggregated latency metric 320 can be an aggregated value (e.g., an average value) of some or all of the latency metrics 318 corresponding to individual IP flows 314.

The latency metric 318 corresponding to a particular IP flow 314 can indicate information that is related to the latency of the IP flow 314. In this context, the term "latency" can refer generally to the amount of time that it takes for data transmissions from the core network 302 to the UE 306 to occur.

One example of a latency metric 318 is a measurement of the round trip time (RTT). In some embodiments, RTT can be measured with respect to individual packet exchanges that are part of an IP flow 314. The RTT of a particular packet exchange can be measured as the amount of time that elapses between (i) the time that the packet is sent from the core network 302 to the RAN 304, and (ii) the time that an acknowledgement of the packet is received at the core network 302.

In some embodiments, the latency metric 318 corresponding to a particular IP flow 314 can indicate an aggregated value (e.g., an average value) for a plurality of metrics that are determined with respect to a plurality of IP packets that have been sent as part of the IP flow 314 over a particular time interval (e.g., during the most recent k minutes). For example, the latency metric 318 corresponding to a particular IP flow 314 can indicate an aggregated value for a plurality of RTT values that are measured with respect to a plurality of IP packets that have been sent as part of the IP flow 314 over a particular time interval.

At least two different thresholds can be defined in relation to an aggregated latency metric 320. These thresholds may be referred to herein as latency thresholds. A first latency threshold 322-1 can indicate when the RAT policy being applied to data transmissions from the core network 302 to the RAN 304 should be changed from the lower bandwidth RAT policy 312-2 to the higher bandwidth RAT policy 312-1. This latency threshold may be referred to herein as the higher bandwidth RAT latency threshold 322-1. A second latency threshold can indicate when the RAT policy being applied to data transmissions from the core network 302 to the RAN 304 should be changed from the higher bandwidth RAT policy 312-1 to the lower bandwidth RAT policy 312-2. This latency threshold may be referred to herein as the lower bandwidth RAT latency threshold 322-2.

Reference is now made to the method 400 shown in FIG. 4. For purposes of example, it will be assumed that the core network 302 initially applies 401 the lower bandwidth RAT policy 312-2 to data transmissions from the core network 302 to the RAN 304. In an alternative embodiment, however, the core network 302 could initially apply the higher bandwidth RAT policy 312-1 to data transmissions from the core network 302 to the RAN 304.

Because the lower bandwidth RAT policy 312-2 is initially applied 401 to data transmissions from the core network 302 to the RAN 304, the method 400 can also include sending 403 a plurality of IP flows 314 to the RAN 304 for delivery to a UE 306. The plurality of IP flows 314 can be sent at a data rate that is based at least in part on the lower bandwidth RAT policy 312-2.

The core network 302 can determine 405 a plurality of latency metrics 316 corresponding to the plurality of IP flows 314. The plurality of latency metrics 316 can include latency metrics 318 corresponding to individual IP flows as well as one or more aggregated latency metrics 320 that represent an aggregated value of some or all of the latency metrics 318 corresponding to individual IP flows.

For purposes of the present example, it will be assumed that the core network 302 determines an aggregated latency metric 320 that represents an aggregated value (e.g., an average value) of the latency metrics corresponding to individual IP flows. The method 400 can include comparing 407 the aggregated latency metric 320 to the higher bandwidth RAT latency threshold 322-1. If the aggregated latency metric 320 is greater than the higher bandwidth RAT latency threshold 322-1, this suggests that the RAN 304 is still using the lower bandwidth RAT for downlink transmissions to UEs 306. In other words, if the aggregated latency metric 320 is greater than the higher bandwidth RAT latency threshold 322-1, the latency of downlink transmissions is still greater than what would be expected if the RAN 304 were using the higher bandwidth RAT for downlink transmissions to UEs 306. Thus, the method 400 can include continuing to apply 401 the lower bandwidth RAT policy 312-2 to data transmissions from the core network 302 to the RAN 304.

However, if the aggregated latency metric 320 is less than the higher bandwidth RAT latency threshold 322-1, this suggests that the RAN 304 is using the higher bandwidth RAT for downlink transmissions to UEs 306. In other words, if the aggregated latency metric 320 is less than the higher bandwidth RAT latency threshold 322-1, the latency of downlink transmissions is within the range of what would be expected if the RAN 304 were using the higher bandwidth RAT for downlink transmissions to UEs 306. The method 400 can therefore include changing the RAT policy that is applied to data transmissions from the core network 302 to the RAN 304. In particular, the method 400 can include applying 409 the higher bandwidth RAT policy 312-1 to data transmissions from the core network 302 to the RAN 304. The method 400 can also include sending 411 the plurality of IP flows 314 to the RAN 304 at a data rate that is based at least in part on the higher bandwidth RAT policy 312-1.

After the RAT policy has been changed, the core network 302 can continue to determine 413 latency metrics 316 corresponding to the plurality of IP flows 314, including latency metrics 318 corresponding to individual IP flows as well as one or more aggregated latency metrics 320.

As long as the aggregated latency metric 320 is less than the higher bandwidth RAT latency threshold 322-1, the core network 302 can continue to apply 409 the higher bandwidth RAT policy 312-1 to downlink transmissions and send the plurality of IP flows 314 to the RAN 304 at a data rate that is based at least in part on the higher bandwidth RAT policy 312-1. However, when the core network 302 detects 415 that the aggregated latency metric 320 has increased above the lower bandwidth RAT latency threshold 322-2, the core network 302 can change the RAT policy that is applied to data transmissions from the core network 302 to the RAN 304. In particular, the core network 302 can reapply 401 the lower bandwidth RAT policy 312-2 to such transmissions and send 403 the plurality of IP flows 314 to the RAN 304 at a data rate that is based at least in part on the lower bandwidth RAT policy 312-2.

The method 400 can proceed in the manner described above as long as the transmission of one or more of the plurality of IP flows 314 continues.

Figure 5:
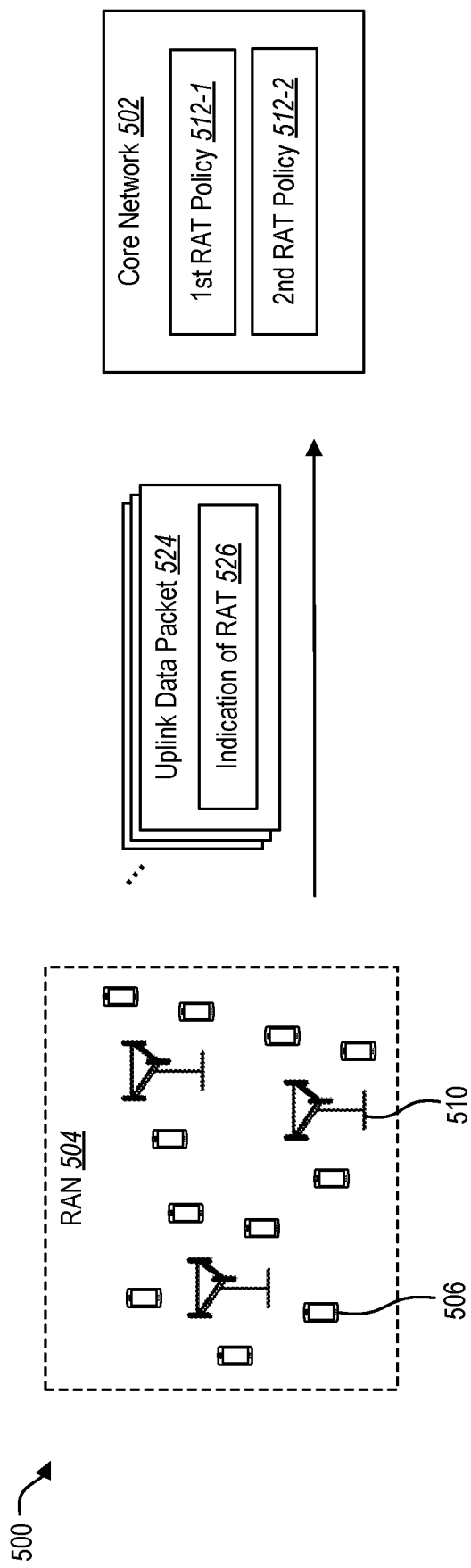
FIG. 5 illustrates another example of a mobile network in which the techniques disclosed herein can be utilized.
Figure 6:
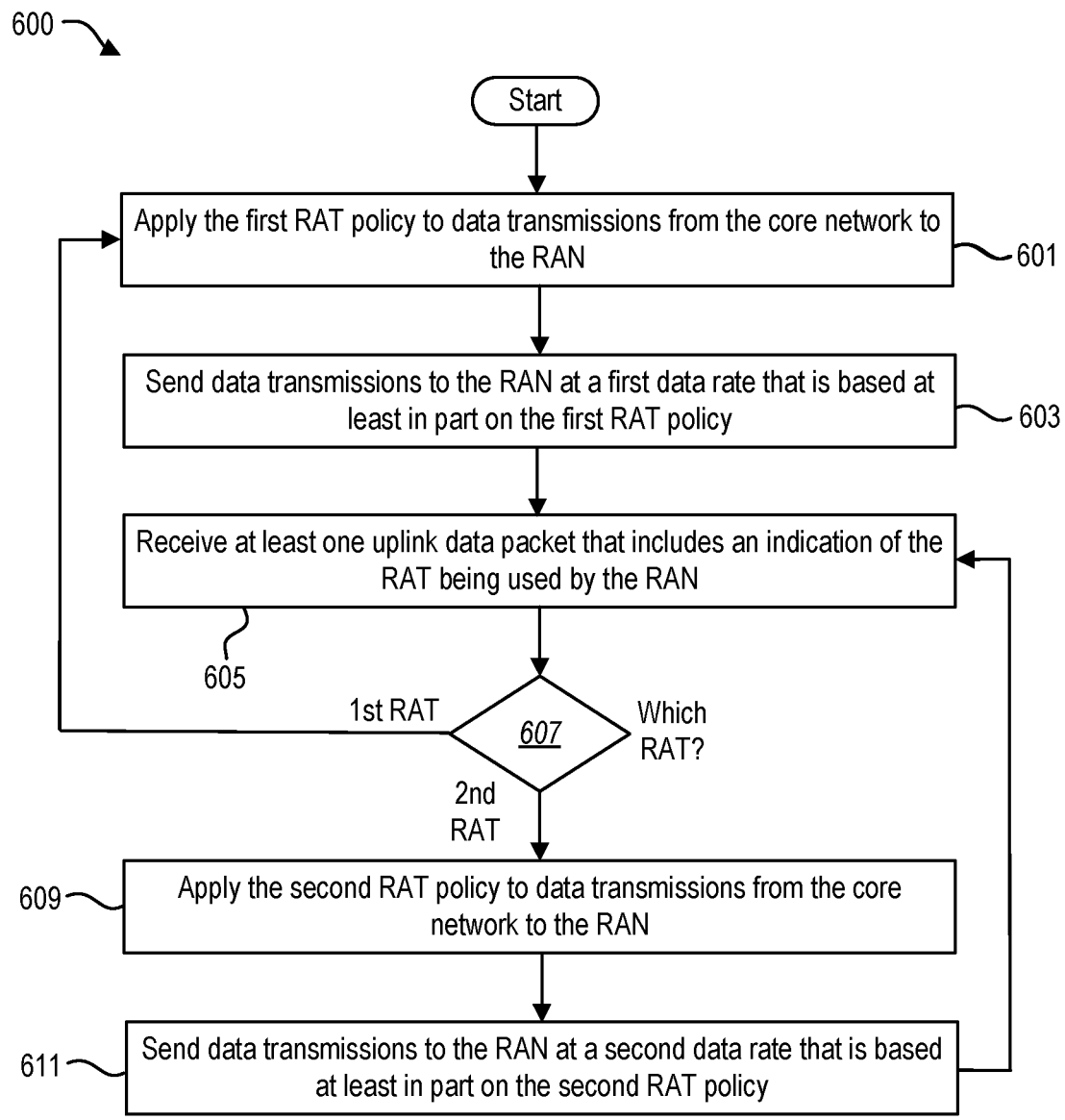
FIG. 6 illustrates an example of a method that can be implemented by a core network in the mobile network shown in FIG. 5.
Figure 7:
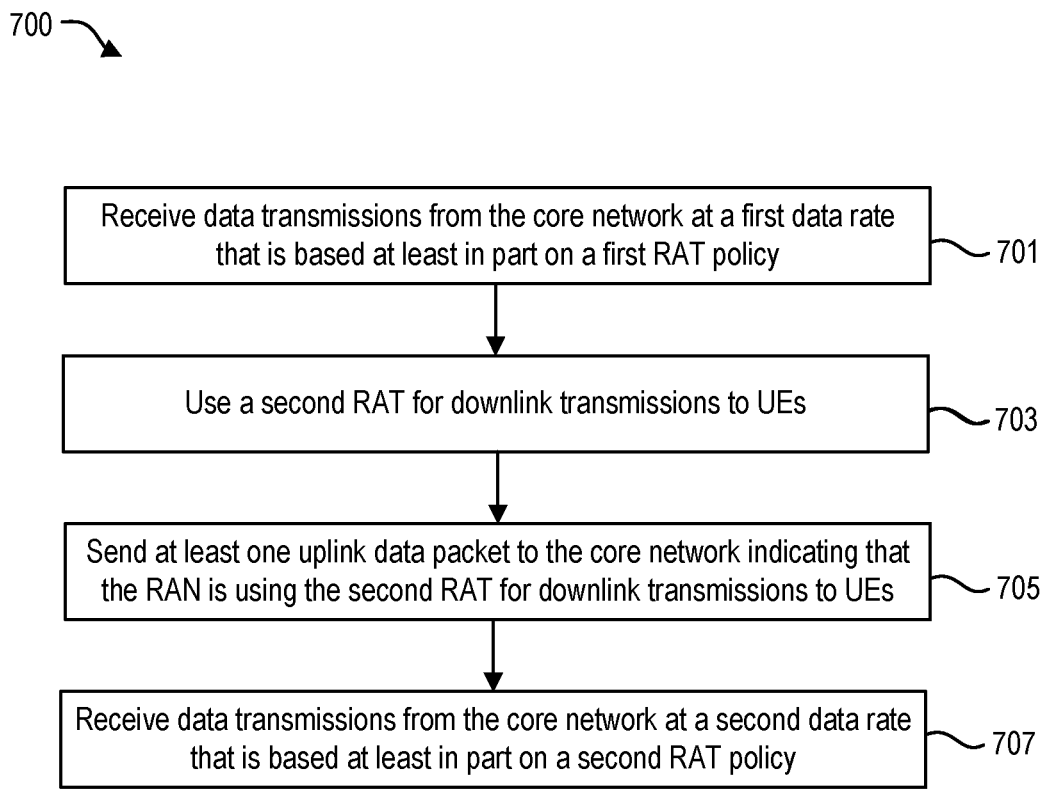
FIG. 7 illustrates an example of a method that can be implemented by a RAN in the mobile network shown in FIG. 5.

FIGS. 5-7 illustrate another example showing how data transmissions from a core network 502 to a RAN 504 can be optimized in accordance with the present disclosure. More specifically, FIG. 5 illustrates another example of a mobile network 500 in which the techniques disclosed herein can be utilized. FIG. 6 illustrates an example of a method 600 that can be implemented by a core network 502 in the mobile network 500. FIG. 7 illustrates an example of a method 700 that can be implemented by a RAN 504 in the mobile network 500.

Reference is initially made to FIG. 5. The mobile network 500 shown in FIG. 5 is similar in many respects to the mobile network 100 shown in FIG. 1. In particular, the mobile network 500 includes a core network 502 and a RAN 504. The RAN 504 includes a plurality of base stations 510 that communicate wirelessly with UEs 506 and enable the UEs 506 to wirelessly connect to the mobile network 500.

The RAN 504 can be configured to use at least two different RATs for wireless transmissions to UEs 506, including a first RAT and a second RAT. A first RAT policy 512-1 can be defined for use in connection with data transmissions from the core network 502 to the RAN 504 when the RAN 504 is using the first RAT. A second RAT policy 512-2 can be defined for use in connection with data transmissions from the core network 502 to the RAN 504 when the RAN 504 is using the second RAT.

The RAN 504 is shown sending a plurality of uplink data packets 524 to the core network 502. In accordance with one aspect of the present disclosure, the structure of an uplink data packet 524 can be modified to include an indication 526 of the RAT that is being used by the RAN 504. In some embodiments, an indication 526 of the RAT being used by the RAN 504 can be included in one or more fields in the header of an uplink data packet 524.

Reference is now made to the method 600 shown in FIG. 6. As noted above, the method 600 shown in FIG. 6 can be implemented by the core network 502.

For purposes of example, it will be assumed that the core network 502 initially applies 601 the first RAT policy 512-1 to data transmissions from the core network 502 to the RAN 504. In an alternative embodiment, however, the core network 502 could initially apply the second RAT policy 512-2 to data transmissions from the core network 502 to the RAN 504.

Because the first RAT policy 512-1 is initially applied 601 to data transmissions from the core network 502 to the RAN 504, the method 600 can also include sending 603 data transmissions to the RAN 504 at a data rate that is based at least in part on the first RAT policy 512-1.

The method 400 can also include receiving 605 at least one uplink data packet 524 that includes an indication 526 of the RAT being used by the RAN 504. The core network 502 can inspect the uplink data packet 524 and determine 607, based on the indication 526 in the uplink data packet 524, which RAT is being used by the RAN 504.

If the uplink data packet 524 indicates that the RAN 504 is using the first RAT, then the core network 502 can continue to apply 601 the first RAT policy 512-1 to data transmissions from the core network 502 to the RAN 504.

However, if the uplink data packet 524 indicates that the RAN 504 is using the second RAT, then the core network 502 can change the RAT policy that is applied to data transmissions from the core network 502 to the RAN 504. In particular, the core network 502 can begin applying 609 the second RAT policy 512-2 to data transmissions from the core network 502 to the RAN 504. Thus, the core network 502 can send 611 data transmissions to the RAN 504 at a data rate that is based at least in part on the second RAT policy 512-2.

The method 600 can continue to proceed in the manner described above. When the RAN 504 changes the type of RAT that it is using (e.g., from the first RAT to the second RAT or vice versa), the RAN 504 can send one or more uplink data packets 524 to the core network 502 that include an indication about this change. When the core network 502 receives an uplink data packet 524 that includes an indication 526 that the type of RAT being used by the RAN 504 has changed, the core network 502 can change the RAT policy that is being used for data transmissions to the RAN 504 in order to match the RAT being used by the RAN 504.

Reference is now made to the method 700 shown in FIG. 7. As noted above, the method 700 shown in FIG. 7 can be implemented by the RAN 504 in the mobile network 500. For example, the method 700 can be implemented by a base station 510 within the RAN 504.

As discussed above, there can be a mismatch between (i) the RAT policy that the core network 502 is applying to downlink transmissions to the RAN 504, and (ii) the RAT that is actually being used by the RAN 504 for downlink transmissions to UEs 506.

For example, the method 700 can include receiving 701 data transmissions from the core network 502 at a first data rate that is based at least in part on the first RAT policy 512-1. As noted above, the first RAT policy 512-1 is based on the first RAT. However, the RAN 504 might not be using the first RAT. In this example, it will be assumed that the RAN 504 is using 703 the second RAT for downlink transmissions to UEs 506.

The method 700 can include sending 705 at least one uplink data packet 524 to the core network 502 indicating that the RAN 504 is using the second RAT. This can cause the core network 502 to change the RAT policy that is being applied to data transmissions from the core network 502 to the RAN 504 (as discussed above). In the present example, it will be assumed that the core network 502 changes the RAT policy from the first RAT policy 512-1 to the second RAT policy 512-2 (as described above in connection with the method 600 shown in FIG. 6). Thereafter, the method 700 can include receiving 707 data transmissions from the core network 502 at a data rate that is based at least in part on the second RAT policy 512-2.

Figure 8:
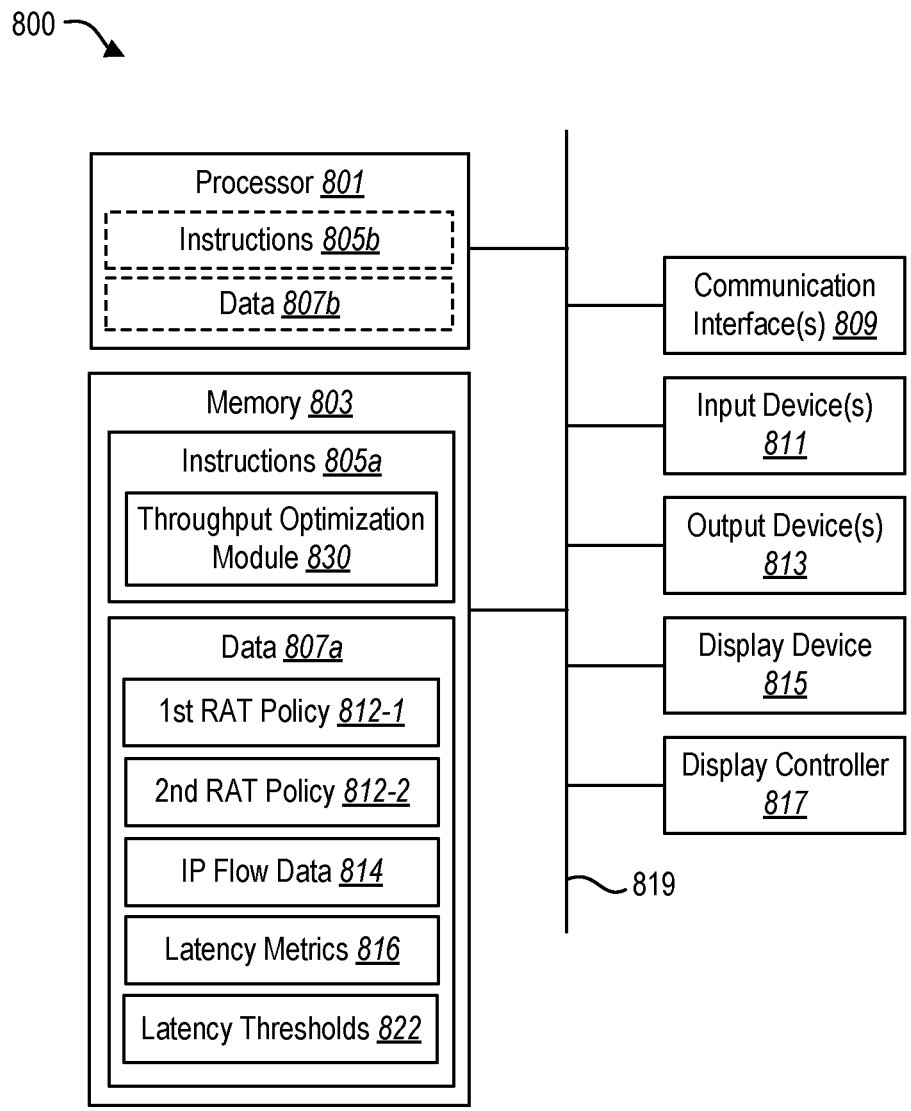
FIG. 8 illustrates certain components that can be included within a computing system that is part of a core network.

The functionality that has been described herein in connection with a core network (e.g., the core network 102 in FIG. 1, the core network 302 in FIG. 3, and/or the core network 502 in FIG. 5) can be implemented using one or more computing systems. FIG. 8 illustrates certain components that can be included within a computing system 800. The computing system 800 can be included in a core network and can be used to implement the actions and operations that have been described herein in connection with a core network. In some embodiments, a core network can include a plurality of computing systems 800 that collectively implement the actions and operations that have been described herein in connection with a core network.

The computing system 800 includes a processor 801 and memory 803 in electronic communication with the processor 801. Instructions 805a and data 807a can be stored in the memory 803. The instructions 805a can be executable by the processor 801 to implement some or all of the methods, steps, operations, actions, or other functionality related to a core network that is disclosed herein. Executing the instructions 805a can involve the use of the data 807a that is stored in the memory 803. When the processor 801 executes the instructions 805a, various instructions 805b can be loaded onto the processor 801, and various pieces of data 807b can be loaded onto the processor 801.

Unless otherwise specified, any of the various examples of modules and components described herein in connection with a core network can be implemented, partially or wholly, as instructions 805a stored in memory 803 and executed by the processor 801. Any of the various examples of data described herein in connection with a core network can be among the data 807a that is stored in memory 803 and used during execution of the instructions 805a by the processor 801.

Although just a single processor 801 and a single memory 803 are shown in the computing system 800 of FIG. 8, in an alternative configuration, a combination of processors and/or a combination of memory devices could be used.

The instructions 805a in the memory 803 can include a throughput optimization module 830. The throughput optimization module 830 represents instructions 805a that can be executable by the processor 801 to perform some or all aspects of the methods that have been described herein in connection with a core network (e.g., the method 200 shown in FIG. 2, the method 400 shown in FIG. 4, and the method 600 shown in FIG. 6).

The data 807a stored in the memory 803 can include any of the various examples of data described herein in connection with a core network. For example, the data 807a stored in the memory 803 can represent data that is stored, accessed, or otherwise used in connection with the methods that have been described herein in connection with a core network (e.g., the method 200 shown in FIG. 2, the method 400 shown in FIG. 4, and the method 600 shown in FIG. 6).

For example, the data 807a stored in the memory 803 can include a plurality of RAT policies, including a first RAT policy 812-1 and a second RAT policy 812-2. The RAT policies shown in FIG. 8 can represent any of the RAT policies described herein (e.g., the first RAT policy 112-1 and the second RAT policy 112-2 shown in FIG. 1, the higher bandwidth RAT policy 312-1 and the lower bandwidth RAT policy 312-2 shown in FIG. 3, and/or the first RAT policy 512-1 and the second RAT policy 512-2 shown in FIG. 5).

The data 807a stored in the memory 803 can also include IP flow data 814. The IP flow data 814 can represent any of the IP flow data described herein (e.g., data corresponding to the IP flows 314 shown in FIG. 3).

The data 807a stored in the memory 803 can also include a latency metrics 816 and latency thresholds 822. The latency metrics 816 can represent any of the latency metrics described herein (e.g., the latency metrics 316 in FIG. 3). The latency thresholds 822 can represent any of the latency thresholds described herein (e.g., the higher bandwidth RAT latency threshold 322-1 and the lower bandwidth RAT latency threshold 322-2 in FIG. 3).

The computing system 800 can also include one or more communication interfaces 809 for communicating with other electronic devices. The communication interface(s) 809 can be used to send data transmissions to a RAN. The data transmissions can include IP flow data 816.

The communication interface(s) 809 can be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing system 800 can also include one or more input devices 811. Some examples of input devices 811 include a keyboard, mouse, microphone, touchpad, remote control device, button, joystick, and trackball. An operator of a core network can use the input devices 811 to input information to the computing system 800. For example, an operator of a core network can use one or more input devices 811 to configure parameters described herein, including but not limited to latency metrics 816 and latency thresholds 822. An operator of a core network can also use one or more input devices 811 to configure RAT policies (e.g., the first RAT policy 812-1 and the second RAT policy 812-2).

A computing system 800 can also include one or more output devices 813. Some examples of output devices 813 include a display device, a speaker, and a printer. An operator of a core network can use one or more output devices 813 to receive information regarding the methods, steps, operations, actions, or other functionality being performed by the core network. For example, latency metrics 816 can be communicated to a network operator via one or more output devices 813.

One specific type of output device 813 that is typically included in a computing system 800 is a display device 815. Display devices 815 used with embodiments disclosed herein can utilize any suitable image projection technology, such as liquid crystal display (LCD), light-emitting diode (LED), gas plasma, electroluminescence, or the like. A display controller 817 can also be provided, for converting data 807a stored in the memory 803 into text, graphics, and/or moving images (as appropriate) shown on the display device 815.

The various components of the computing system 800 can be coupled together by one or more buses, which can include a power bus, a control signal bus, a status signal bus, a data bus, etc. For the sake of clarity, the various buses are illustrated in FIG. 8 as a bus system 819.

Figure 9:
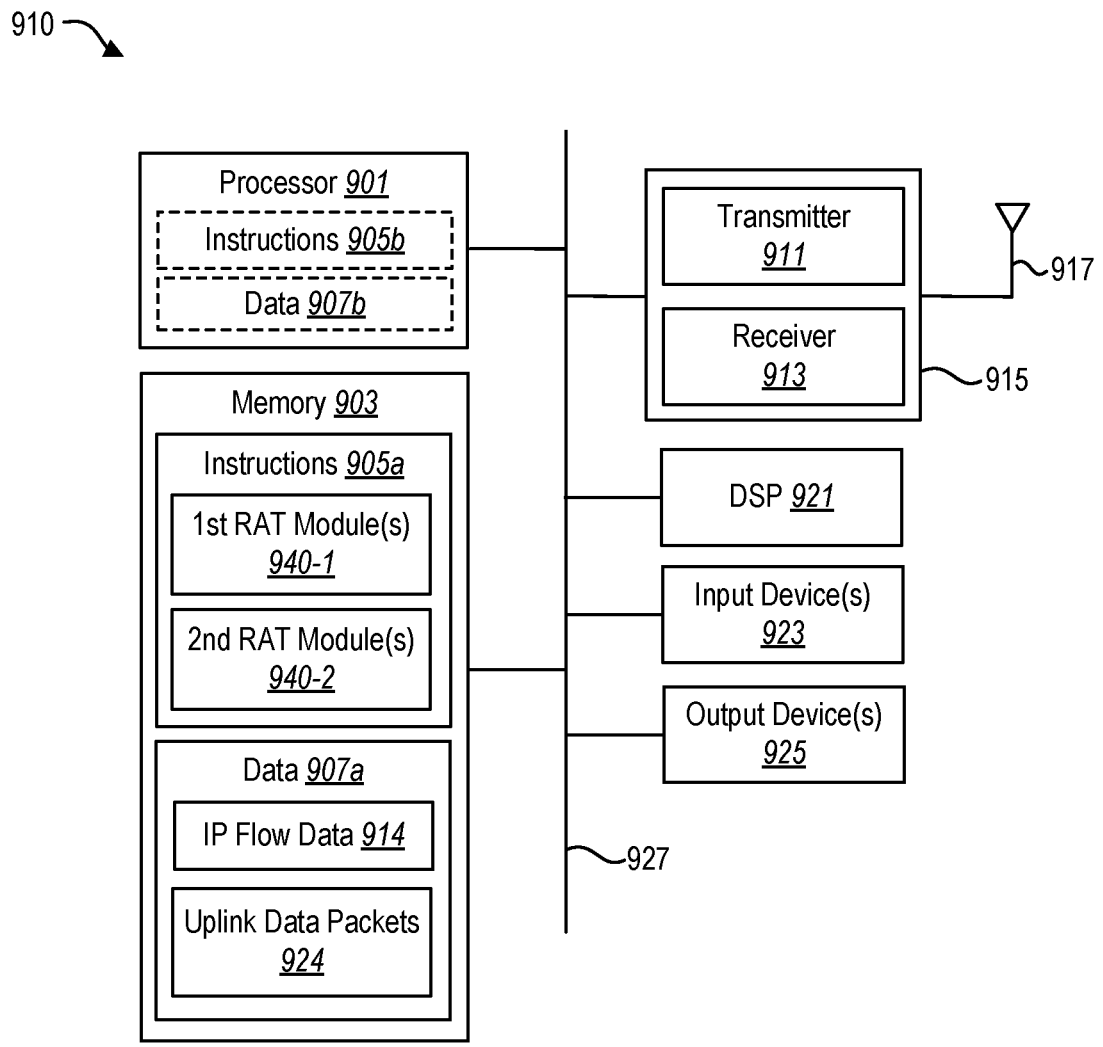
FIG. 9 illustrates certain components that can be included within a base station that is a part of a radio access network.

FIG. 9 illustrates certain components that can be included within a base station 910 that is a part of a radio access network (RAN). Any of the base stations described herein (e.g., the base stations 110 in FIG. 1, the base stations 310 in FIG. 3, the base stations 510 in FIG. 5) can include some or all of the components of the base station 900 shown in FIG. 9.

The base station 910 includes a processor 901 and memory 903 in electronic communication with the processor 901. Instructions 905a and data 907a can be stored in the memory 903. The instructions 905a can be executable by the processor 901 to implement some or all of the methods, steps, operations, actions, or other functionality related to a base station, or to a RAN generally, that is disclosed herein. Executing the instructions 905a can involve the use of the data 907a that is stored in the memory 903. When the processor 901 executes the instructions 905a, various instructions 905b can be loaded onto the processor 901, and various pieces of data 907b can be loaded onto the processor 901.

Unless otherwise specified, any of the various examples of modules and components described herein in connection with a base station, or with a RAN, can be implemented, partially or wholly, as instructions 905a stored in memory 903 and executed by the processor 901. Any of the various examples of data described herein in connection with a base station, or a RAN generally, can be among the data 907a that is stored in memory 903 and used during execution of the instructions 905a by the processor 901.

Although just a single processor 901 and a single memory 903 are shown in the base station 910 of FIG. 9, in an alternative configuration, a combination of processors and/or a combination of memory devices could be used.

The base station 910 can be configured to use a plurality of different RATs. The instructions 905a are shown as including one or more first RAT modules 940-1 and one or more second RAT modules 940-2. The first RAT module(s) 940-1 represent instructions 905a that can be executed by the processor 901 to implement actions or operations that are performed in connection with transmitting data in accordance with a first RAT. Similarly, the second RAT module(s) 940-2 represent instructions 905a that can be executed by the processor 901 to implement actions or operations that are performed in connection with transmitting data in accordance with a second RAT.

The data 907a stored in the memory 903 can include any of the various examples of data described herein in connection with a base station or a RAN. For example, the data 907a stored in the memory 903 can represent data that is stored, accessed, or otherwise used in connection with the methods that have been described herein in connection with a base station or a RAN (e.g., the method 700 shown in FIG. 7).

The data 907a stored in the memory 903 can also include IP flow data 914. The IP flow data 914 can represent any of the IP flow data described herein (e.g., data corresponding to the IP flows 314 shown in FIG. 3).

The data 907a stored in the memory 903 can also include uplink data packets 924. The uplink data packets 924 can represent the uplink data packets 524 shown in FIG. 5. As discussed above, at least some of the uplink data packets 924 can include indications of the RAT being used by the base station 910.

The base station 910 can also include a transmitter 911 and a receiver 913 to allow transmission and reception of signals to and from other wireless devices (e.g., UEs) via one or more antennas 917. The transmitter 911 and receiver 913 may be collectively referred to as a transceiver 915. The base station 910 may also include (not shown) multiple transmitters, multiple antennas, multiple receivers and/or multiple transceivers.

The base station 910 can also include a digital signal processor (DSP) 921. The base station 910 can also include one or more input devices 923 and one or more output devices 925. The input device(s) 923 and the output device(s) 925 enable a user (such as a network operator) to interact with the base station 910.

The various components of the base station 910 can be coupled together by one or more buses, which may include a power bus, a control signal bus, a status signal bus, a data bus, etc. For the sake of clarity, the various buses are represented in FIG. 9 as a bus system 927.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for optimizing data transmissions from a core network to a radio access network (RAN) based on a radio access technology (RAT) being used by the RAN for downlink transmissions to UEs, the RAN being configured to use a first RAT and a second RAT for the downlink transmissions to the UEs, the method being implemented by the core network, the method comprising:
   sending first data transmissions from the core network to the RAN at a first data rate that is based at least in part on a first RAT policy associated with the first RAT;
   determining that the RAN is using the second RAT for the downlink transmissions to the UEs, the second RAT being associated with a second data rate different from the first data rate of the first RAT policy used in sending the first data transmissions from the core network to the RAN;
   causing a RAT policy that is applied to the first data transmissions from the core network to the RAN to be changed in response to determining that the RAN is using the second RAT for the downlink transmissions to the UEs, wherein the RAT policy is changed from the first RAT policy to a second RAT policy that is associated with the second RAT; and
   sending second data transmissions from the core network to the RAN at a second data rate that is based at least in part on the second RAT policy associated with the second RAT.

2. The method of claim 1, wherein:
   the first RAT supports higher data rates than the second RAT;
   the first RAT policy allows a higher data rate for the data transmissions from the core network to the RAN than the second RAT policy; and
   the first data rate is higher than the second data rate.

3. The method of claim 1, wherein:
   the second RAT supports higher data rates than the first RAT;
   the second RAT policy allows a higher data rate for the data transmissions from the core network to the RAN than the first RAT policy; and
   the second data rate is higher than the first data rate.

4. The method of claim 1, wherein:
   the first RAT policy comprises a first rule that should be applied to the data transmissions from the core network to the RAN when the RAN is using the first RAT; and
   the second RAT policy comprises a second rule that should be applied to the data transmissions from the core network to the RAN when the RAN is using the second RAT.

5. The method of claim 1, wherein:
   the first RAT policy comprises a first maximum data rate for the data transmissions from the core network to the RAN when the RAN is using the first RAT; and
   the second RAT policy comprises a second maximum data rate for the data transmissions from the core network to the RAN when the RAN is using the second RAT.

6. The method of claim 1, wherein:
   the RAN and the core network are part of a fifth generation (5G) mobile network;
   the first RAT is based on millimeter wave (mmWave) frequencies; and
   the second RAT is based on at least one of sub-6 GHz frequencies or low band frequencies.

7. The method of claim 1, wherein the first data transmissions and the second data transmissions comprise a plurality of IP flows, and wherein obtaining the information indicating that the RAN is using the second RAT comprises:
   determining at least one latency metric corresponding to the plurality of IP flows; and
   comparing the at least one latency metric to at least one threshold.

8. The method of claim 1, wherein obtaining the information indicating that the RAN is using the second RAT comprises:
   inspecting uplink packets sent by the RAN; and
   identifying an indication about a RAT type being used by the RAN in at least one uplink packet.

9. The method of claim 1, wherein causing the RAT policy that is applied to the data transmissions from the core network to the RAN to be changed comprises notifying a content provider that the RAN is using the second RAT.

10. A method for optimizing data transmissions from a core network to a radio access network (RAN) based on a radio access technology (RAT) being used by the RAN for downlink transmissions to UEs, the RAN being configured to use a first RAT and a second RAT for the downlink transmissions to the UEs, the method being implemented by the RAN, the method comprising:
   receiving first data transmissions from the core network at a first data rate that is based at least in part on a first RAT policy applied by the core network, wherein the first RAT policy is associated with the first RAT;

using the second RAT for the downlink transmissions to the UEs;

sending at least one uplink data packet to the core network indicating that the RAN is using the second RAT for the downlink transmissions to the UEs, the second RAT being associated with a second data rate different from the first data rate of the first RAT policy used in the first data transmissions from the core network; and receiving second data transmissions from the core network at a second data rate that is based at least in part on a second RAT policy applied by the core network, wherein the second RAT policy is associated with the second RAT.

11. The method of claim 10, wherein:
the first RAT supports higher data rates than the second RAT;
the first RAT policy allows a higher data rate for the data transmissions from the core network to the RAN than the second RAT policy; and
the first data rate is higher than the second data rate.

12. The method of claim 10, wherein:
the second RAT supports higher data rates than the first RAT;
the second RAT policy allows a higher data rate for the data transmissions from the core network to the RAN than the first RAT policy; and
the second data rate is higher than the first data rate.

13. The method of claim 10, wherein:
the RAN and the core network are part of a fifth generation (5G) mobile network;
the first RAT is based on millimeter wave (mmWave) frequencies; and
the second RAT is based on at least one of sub-6 GHz frequencies or low band frequencies.

14. A system for optimizing data transmissions from a core network to a radio access network (RAN) based on a radio access technology (RAT) being used by the RAN for downlink transmissions to UEs, the RAN being configured to use a first RAT and a second RAT for the downlink transmissions to the UEs, the system comprising:
one or more processors;
memory in electronic communication with the one or more processors;
a first RAT policy stored in the memory, the first RAT policy being associated with the first RAT used by the RAN;
a second RAT policy stored in the memory, the second RAT policy being associated with the second RAT used by the RAN; and
instructions stored in the memory, the instructions being executable by the one or more processors to:
send first data transmissions from the core network to the RAN at a first data rate that is based at least in part on the first RAT policy;
determine that the RAN is using the second RAT for the downlink transmissions to the UEs, the second RAT being associated with a second data rate different from the first data rate of the first RAT policy used in sending the first data transmissions from the core network to the RAN;
cause a RAT policy that is applied to the first data transmissions from the core network to the RAN to be changed in response to determining that the RAN is using the second RAT for the downlink transmissions to the UEs, wherein the RAT policy is changed from the first RAT policy to the second RAT policy; and
send second data transmissions from the core network to the RAN at a second data rate that is based at least in part on the second RAT policy.

15. The system of claim 14, wherein:
the first RAT supports higher data rates than the second RAT;
the first RAT policy allows a higher data rate for the data transmissions from the core network to the RAN than the second RAT policy; and
the first data rate is higher than the second data rate.

16. The system of claim 14, wherein:
the second RAT supports higher data rates than the first RAT;
the second RAT policy allows a higher data rate for the data transmissions from the core network to the RAN than the first RAT policy; and
the second data rate is higher than the first data rate.

17. The system of claim 14, wherein:
the first RAT policy comprises a first rule that should be applied to the data transmissions from the core network to the RAN when the RAN is using the first RAT; and
the second RAT policy comprises a second rule that should be applied to the data transmissions from the core network to the RAN when the RAN is using the second RAT.

18. The system of claim 14, wherein:
the RAN and the core network are part of a fifth generation (5G) mobile network;
the first RAT is based on millimeter wave (mmWave) frequencies; and
the second RAT is based on at least one of sub-6 GHz frequencies or low band frequencies.

19. The system of claim 14, wherein the first data transmissions and the second data transmissions comprise a plurality of IP flows, and wherein obtaining the information indicating that the RAN is using the second RAT comprises:
determining at least one latency metric corresponding to the plurality of IP flows; and
comparing the at least one latency metric to at least one pre-defined threshold.

20. The system of claim 14, wherein obtaining the information indicating that the RAN is using the second RAT comprises:
inspecting uplink packets sent by the RAN; and
identifying an indication about a RAT type being used by the RAN in at least one uplink packet.

* * * * *